United States Patent [19]

Kawade

[11] Patent Number: 4,648,575
[45] Date of Patent: Mar. 10, 1987

[54] HEIGHT ADJUSTING DEVICE FOR VEHICLE SEAT

[75] Inventor: Tateo Kawade, Toda, Japan

[73] Assignee: Honda Giken Kogyo Kabushiki Kaisha, Japan

[21] Appl. No.: 753,827

[22] Filed: Jul. 11, 1985

[30] Foreign Application Priority Data

Jul. 16, 1984 [JP] Japan .................... 59-145989

[51] Int. Cl.⁴ ............................ F16M 13/00
[52] U.S. Cl. ........................ 248/371; 248/421; 248/422
[58] Field of Search ........... 248/651, 652, 660, 664, 248/665, 669, 371, 372.1, 393–396, 398, 157, 419, 421–422; 297/327, 328; 296/63, 65 R

[56] References Cited

U.S. PATENT DOCUMENTS

| | | | |
|---|---|---|---|
| 1,957,785 | 5/1934 | Knapp | 248/422 |
| 2,132,009 | 10/1938 | Ball | 248/394 |
| 2,179,085 | 11/1939 | De Rose | 248/394 |
| 2,227,764 | 1/1941 | Saunders | 248/421 |
| 3,692,271 | 9/1972 | Homier | 248/394 |
| 4,159,095 | 6/1979 | Pallant | 248/396 |
| 4,190,225 | 2/1980 | Bauer | 248/396 |
| 4,222,543 | 9/1980 | Gedig | 248/396 |
| 4,247,071 | 1/1981 | Carella | 248/396 |
| 4,529,159 | 7/1985 | Terada | 248/421 |
| 4,533,027 | 8/1985 | Otani | 248/394 |
| 4,556,185 | 12/1985 | Takagi | 248/421 |

FOREIGN PATENT DOCUMENTS

| | | | |
|---|---|---|---|
| 2032252 | 1/1972 | Fed. Rep. of Germany | 248/394 |
| 2409579 | 9/1975 | Fed. Rep. of Germany | 248/396 |
| 110065 | 8/1979 | Japan . | |
| 1394622 | 5/1975 | United Kingdom | 296/65 R |

Primary Examiner—J. Franklin Foss
Assistant Examiner—Robert A. Olson
Attorney, Agent, or Firm—Armstrong, Nikaido, Marmelstein & Kubovcik

[57] ABSTRACT

A height adjusting device for a vehicle seat which has a function of moving a front part of the seat up and down to set up a desired inclination of the seat and a function of moving both the front and rear parts of the seat up and down to adjust the level of the whole seat. A clutch mechanism for coupling and uncoupling a lifter adjustment input member and a height adjustment input member is actuated by a control member which is adapted to rotate the lifter adjustment input member. When the clutch mechanism is uncoupled and the lifter adjustment input member is rotated, only that input member is rotated to raise or lower only the front part of the seat. When the clutch mechanism is coupled and the lifter adjustment input member is rotated, the height adjustment input member is rotated together with the lifter adjustment input member to raise or lower both the front and rear parts of the seat. Lifter adjustment and height adjustment are accomplished as desired merely by manipulating the single control member.

8 Claims, 13 Drawing Figures

HEIGHT ADJUSTING DEVICE FOR VEHICLE SEAT

BACKGROUND OF THE INVENTION

The present invention relates to a device for adjusting the height of a seat which is mounted in an automotive vehicle or like vehicle and, more particularly, to a height adjusting device for a vehicle seat of the type capable of raising or lowering only a front part of the seat to adjust seat inclination or both the front part and a rear part to adjust the level of the whole seat as desired.

In a vehicle such as an automotive vehicle, a driver's seat should preferably be furnished with instrumentations for various kinds of adjustment in order to ensure a wide visual field and a stable driving position. For example, it is desirable that the height of the whole seat be adjustable to offer a wide visual field with no regard to the eye-point which differs from one person to another due to different body dimensions. It is also desirable the the height of a front part of the seat be controllable independently of a rear part to adjust the seat to an inclination which stably supports any particular operator's body in an optimum driving position. Hereinafter, the adjustment of the whole seat and that of the seat front part will respectively be referred to as height adjustment and lifter adjustment for brevity.

To meet the above demands, some modern seats for use with vehicle are equipped with a seat height control device which fulfills both the height adjustment and the lifter adjustment. A seat height control device of the kind known in the art generally comprises a seat-front support mechanism and a seat-rear support mechanism which support respectively a front part and a rear part of a seat while allowing them to be moved up and down. The seat-front and seat-rear support mechanisms are operated independently of each other.

Japanese Unexamined Patent Publication (Kokai) No. 54-110065, for example, discloses a seat height control device in which the seat-front and seat-rear support mechanisms each comprise a toothed plate which is constantly biased upwardly by a spring, and a link. A pin is associated with each of the toothed plates and actuated by a handle into and out of engagement with its associated toothed plate. With such a device, one may raise a seat front part for lifter adjustment by manipulating the handle associated with the seat front support mechanism, or raise a seat front part and a seat rear part at the same time for height adjustment by manipulating both of the handles.

The problem with such a prior art seat height control device is that the height adjustment is unattainable unless the two handles are operated one after the other, resulting in awkward manipulation. Another problem is that the two handles which have to be positioned near the seat are undesirable considering a limited space available within a vehicle compartment.

Moreover, since the handles simply play the role of locking and unlocking their associated support mechanisms and not the role of directly raising and lowering the seat, a manipulated amount of each handle has no relation with a raised or lowered amount of the seat. Hence, the weight and other loads which the seat bears have to be adjusted in the course of the adjustment of the seat height; adjusting the seat to an optimum height in such a manner is very time-consuming.

SUMMARY OF THE INVENTION

It is therefor an object of the present invention to provide a height adjusting device for a vehicle seat which accomplishes both the lifter adjustment and the height adjustment by means of a single control member.

It is another object of the present invention to provide a height adjusting device for a vehicle seat which allows the seat to be steplessly controlled in height complementarily to a manipulated amount of the control member and then positively locked at a selected level.

It is another object of the present invention to provide a generally improved height adjusting device for a vehicle seat.

In order to achieve the above objects, in accordance with the present invention, a lifter adjustment input member for moving only a front part of a seat up and down and a height adjustment input member for simultaneously moving the front and rear parts of the seat up and down are rotatably supported on the same axis on seat bracket bases, which are supported by a vehicle body. A clutch mechanism is interposed between the two input members for selectively coupling to allow them to rotate integrally with each other and uncoupling to allow them to rotate relative to each other. A control member is associated with the lifter adjustement input member for rotating the input member and switching the coupled and uncoupled conditions of the clutch mechanism.

The seat is supported by a seat front part support mechanism and a seat rear part support mechanism adapted respectively to raise and lower the front and rear parts of the seat, respectively. The seat front part support mechanism is actuated by the lifter adjustment input member, and the seat rear part support mechanism by the height adjustment input member. The seat front part support mechanism and seat rear part support mechanism may comprise support arms which are rotatably supported at one end by the seat bracket bases and at the other end connected to the seat by links which are rotatably connected at one end to the seat bracket bases and the seat. One of the support arms preferably comprise a gear arm and the other support arm is preferably be rotated by a sector gear which is mounted coaxially with and rotatably relative to the gear arm, so that the gear arm and the sector gear may be rotated by the lifter adjustment input member and the height adjustment input member, respectively.

A seat lock arrangement is provided for locking the seat front part and seat rear part support mechanisms each in a selected position. The seat lock arrangement preferably comprises a mechanical brake which transmits a torque applied thereto from an input side, but brakes responsive to a torque applied thereto from an output side. In such a case, two mechanical brakes are used one of which has an input shaft connecting to the lifter adjustment input member and an output rotary member connecting to the seat front part support mechanism, and the other of which having an input shaft connecting to the height adjustment input member and an output rotary member connecting to the seat rear part support mechanism.

The control member capable of rotating the two input members and coupling and uncoupling the clutch mechanism may comprise a control lever which is mounted on the lifter adjustment input member. The control lever is axially slidably supported. When pulled up or pushed down, the control lever causes the lifter adjustment input member to rotate and, when moved in the axial direction, it couples and uncouples the clutch mechanism. Specifically, the control lever is provided with a smaller diameter portion and a larger diameter portion such that when it is axially moved an actuating lever which is constantly engaged with the outer periphery of the control lever is rotated to actuate the clutch mechanism.

The clutch mechanism may comprise a cam slot formed through the height adjustment input member and a clutch pawl mounted on the lifter adjustment input member and engaged in the cam slot. The cam slot is made up of a slot for locking the clutch pawl and an arcuate slot for allowing the clutch pawl to angularly move therealong. The clutch pawl is movable between a position where it becomes received in the locking slot and a position where it becomes received in the arcuate slot, in response to, for example, rotation of the actuating lever caused by axial sliding movement of the control lever.

In the height adjusting device having the above construction, when the control lever or like control member is axially moved, for example, the clutch mechanism is switched to couple or uncouple the lifter adjustment and height adjustment input members. While the two input members are uncoupled, pulling up the control member, for example, causes only the lifter adjustment input member to rotate complementarily to the amount of manipulation and, thereby, actuates the seat front part support mechanism. As a result, only the front part of the seat is raised or lowered to change the seat inclination. As an optimum seat inclination is reached, the control member is released to activate the mechanical brakes or like seat lock mechanisms to lock the seat front part support mechanism in the selected position. In this manner, lifter adjustment complementary to a manipulated amount of the control member is accomplished.

While the lifter adjustment and height adjustment input members are coupled by the clutch mechanism, rotating the former through the control member such as the control lever causes the latter to rotate at the same time. In this condition, both the seat front part and seat rear part support mechanisms are operated complementarily to the manipulated amount of the control member to in turn raise or lower the front and rear seat parts at the same time. When the rotation of the control member is stopped, the seat lock mechanisms lock the seat front part and seat rear part support mechanisms in place with the result that the height of the whole seat is adjusted complementarily to the manipulation of the control member.

The above and other objects, features and advantages of the present invention will become more apparent from the following detailed description taken with the accompanying drawings.

DESCRIPTION OF THE PREFERRED EMBODIMENT

While the height adjusting device for a vehicle seat of the present invention is susceptible of numerous physical embodiments, depending upon the environment and requirements of use, a substantial number of the herein shown and described embodiment have been made, tested and used, and all have performed in an eminently satisfactory manner.

Figure 1A:
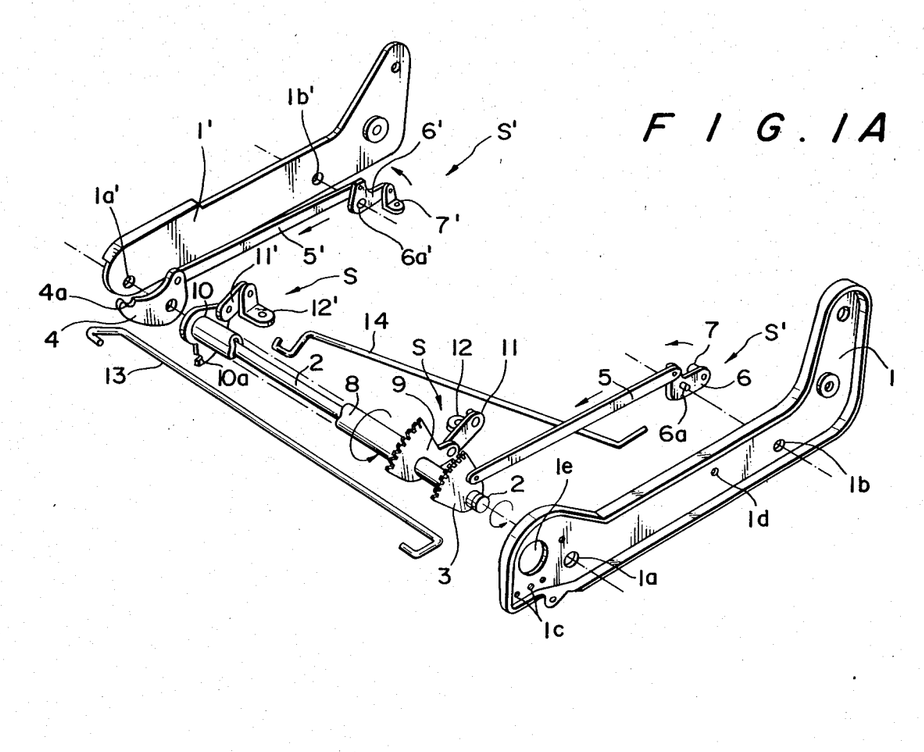
FIGS. 1A and 1B are exploded perspective views of a height adjusting device for a vehicle seat embodying the present invention.
Figure 2:
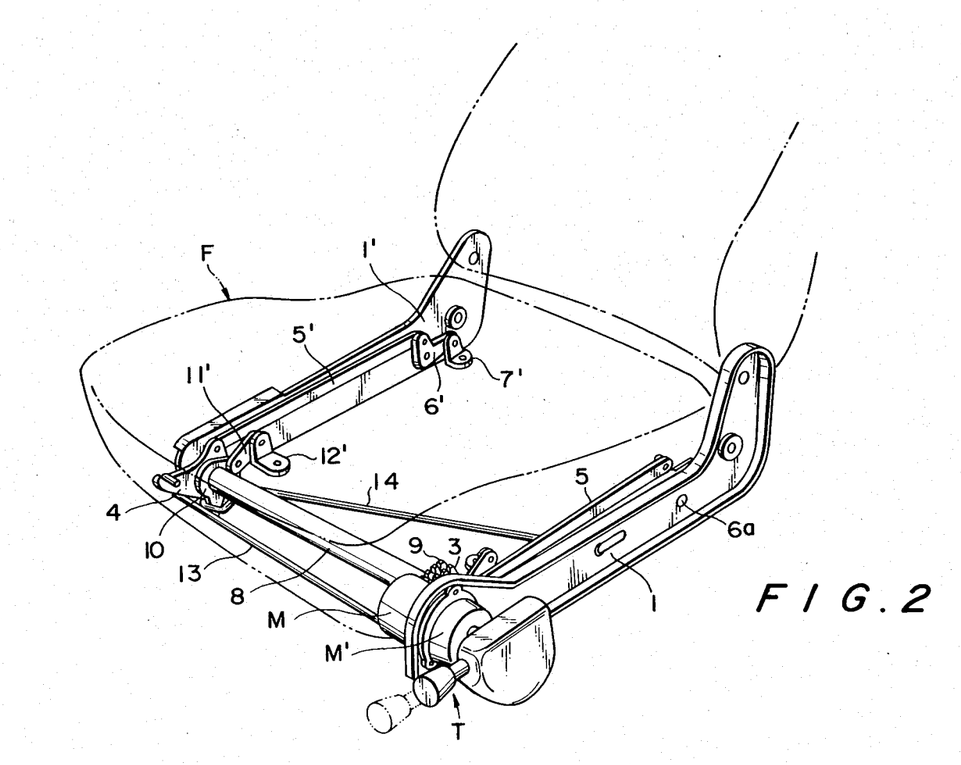
FIG. 2 is a perspective view of the overall construction of the device shown in FIGS. 1A and 1B which is shown in an assembled condition.

Referring to FIG. 1A, a seat height adjuster embodying the present invention is shown. As shown, a pair of seat bracket bases 1 and 1' are rigidly mounted in laterally spaced positions on a vehicle floor. The seat bracket bases 1 and 1' respectively are provided with openings 1a and 1a' in their front portions for rotatably supporting a height control shaft 2. A sector gear 3 is rigidly mounted on a left end portion (at right in the drawing) of the height control shaft 2 by means of splines or like suitable connecting means. Likewise, an actuating arm 4 is rigid on a right end portion (at left in the drawing) of the shaft 2 and provided with a recess 4a. A rod 5 is hinged at one end to the sector gear 3, and a rod 5' to the actuating arm 4. The other end of the rod 5 is hinged to the front end of a generally L-shaped rear support arm 6, and the other end of the rod 5' to the front end of a generally L-shaped rear support arm 6'. A hinge pin 6a extends from an intermediate portion of the rear support arm 6 to be rotatably received in an opening 1b formed through the seat bracket base 1. Likewise a hinge pin 6a' extends from an intermediate portion of the other rear support arm 6' to be rotatably received in an opening 1b' formed through the seat bracket base 1'. Rear seat brackets 7 and 7' are rotatably supported by the rear ends of the arms 6 and 6', respectively. The seat brackets 7 and 7' are rigidly connected to a rear portion of a seat F (FIG. 2). In this construction, the rear support arms 6 and 6' which are rotatable driven by their associated rods 5 and 5' and the rear seat brackets 7 and 7' constitute a seat rear portion support mechanism S' for mounting the rear portion of the seat F to the seat bracket bases 1 and 1'.

A hollow lifter control shaft 8 is coupled over the height control shaft 2 coaxially therewith and rotatably supported at opposite ends thereof by the sector gear 3 and the actuating arm 4. A gear arm, or front support arm, 9 having a toothed surface as illustrated is fixed to a left end portion of the lifter control shaft 8 by suitable means such as welding. Another front support arm 10 provided with a recess 10a is fixed in the same manner to a right end portion of the shaft 8. A link 11 is rotatably connected at one end to the rear end of gear arm 9, and another link 11' to the rear end of the support arm 10. At the other end, the links 11 and 11' rotatably support front seat brackets 12 and 12', respectively. The seat brackets 12 and 12' are to be fixed to a front part of the seat F. In this particular embodiment, the arms 9 and 10, links 11 and 11' and front seat brackets 12 and 12' constitute in combination a seat front part support mechanism S. The linkage made up of the arm 9 and link 11 and the linkage made up of the arm 10 and link 11' will each bend to the greatest angle when the seat F is moved to the lowest position and will stretch as the seat F is raised.

The seat bracket base 1 is provided with a pair of apertures 1c in a front lower portion thereof. A return spring 13 sharing in height adjustment is bent at opposite ends and engaged at one of the bent ends in the apertures 1c of the seat bracket base 1 and at the other end in the recess 4a of the actuating arm 4. An aperture 1d is formed through an intermediate portion of the seat bracket base 1, while a return spring 14 sharing in lifter adjustment is retained at its left end in the aperture 1d. The right end of the return spring 14 is engaged in the recess 10a of the front support arm 10. Both the return springs 13 and 14 are arranged to constantly bias the seat F upwardly and, therefore, exert a part of the force which is necessary for raising the seat F as will be described.

Figure 1B:
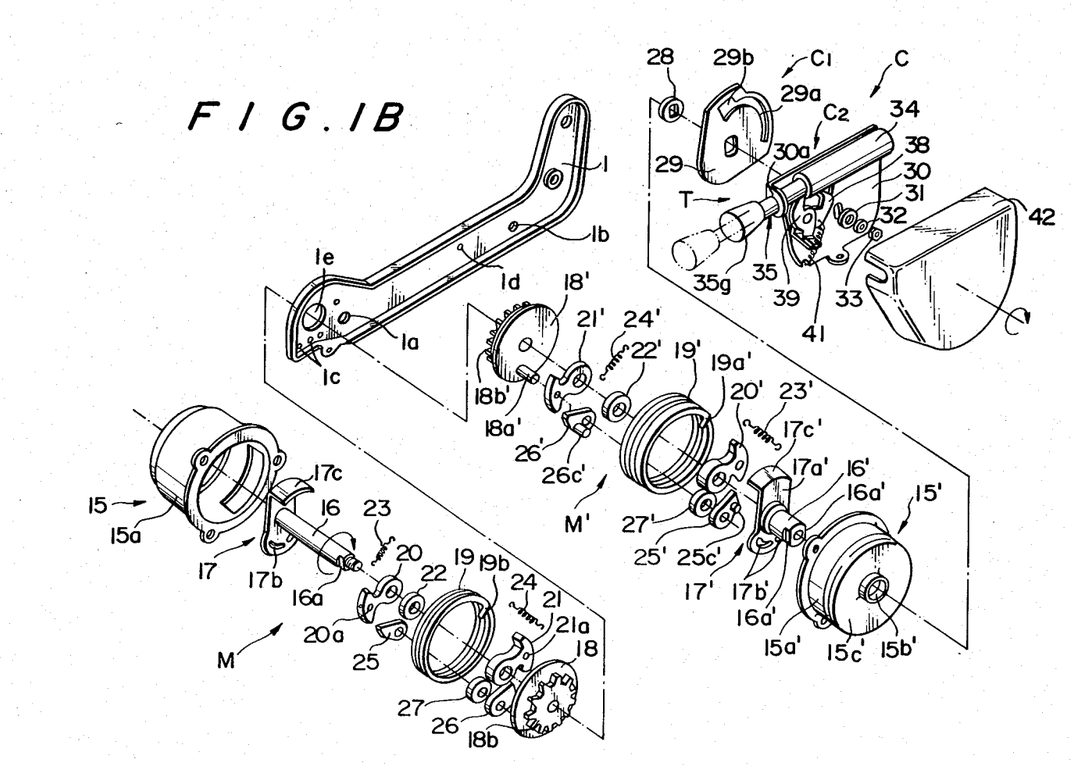
Figure 3:
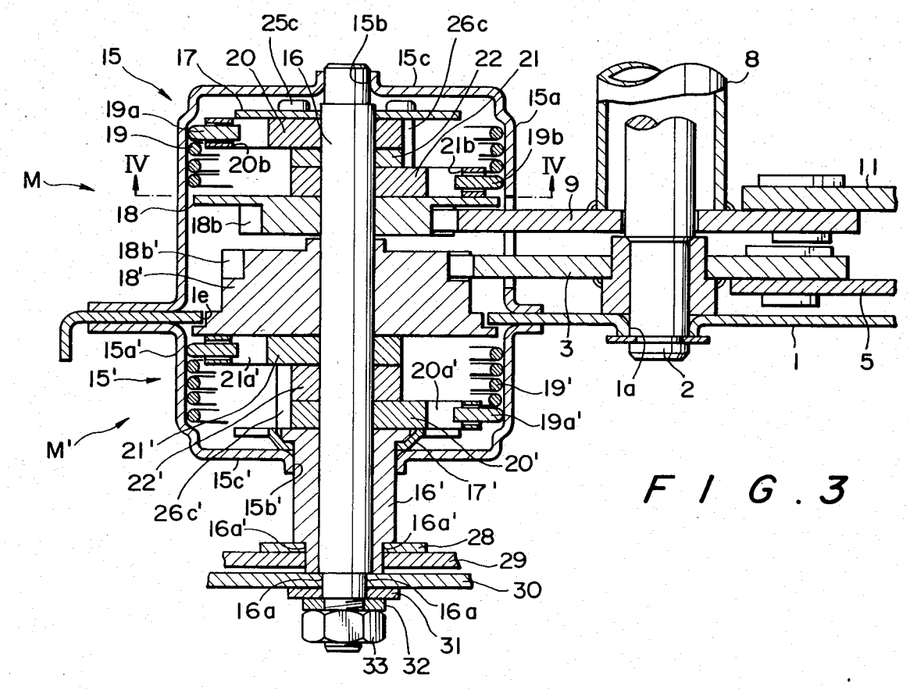
FIG. 3 is a horizontally sectioned plan view of a mechanical brake section along line III—III of FIG. 4A included in the same device.

The left seat bracket base 1 is further provided at its front end portion with an opening 1e throughout which an input device extends. As shown in FIGS. 1B and 3, a brake drum 15 is rigidly connected to the inner surface of the seat bracket base 1 around the opening 1e, and a brake drum 15' to the outer surface of the same around the opening 1e. The brake drums 15 and 15' comprise respectively cylindrical walls 15a and 15a', and bottom walls 15c and 15c' which respectively are formed with openings 15b and 15b'. Rotatably received in the opening 15b of the inner brake drum 15 is a reduced diameter portion of an input shaft 16 for lifter adjustment which is positioned inwardly of the seat bracket base 1. The input shaft 16 terminates at the other or outer end at a threaded reduced diameter portion, while that part of the other or larger diameter portion of the input shaft 16 which neighbors the threaded reduced diameter portion is notched to have a pair of parallel flat surfaces 16a. the outermost end of the input shaft 16 protrudes outwardly beyond the bottom wall 15c' of the brake drum 15' through the opening 15b'.

A hollow cylindrical input shaft 16' for height adjustment is rotatably coupled over the outer end portion of the input shaft 16. The input shaft 16' extends throughout the opening 15b' of the outer brake drum 15' beyond the bottom wall 15c' so as to be rotatably supported in the opening 15b'. Also provided in the outer end portion of the input shaft 16' are a pair of parallel flat surfaces 16a'.

An input plate 17 for lifter adjustment is fixed to the inner end of the input shaft 16. The input plate 17 includes a vertical flat portion which is perpendicular to the input shaft 16 and formed with an aperture 17a (FIG. 4A) and a pair of bent slots 17b, and a pawl 17c extending along the input shaft 16. Likewise, an input plate 17' for height adjustment is rigidly mounted on the inner end of the input shaft 16' and provided with an aperture 17a', a pair of bent slots 17b', and a pawl 17c'.

An output rotary member 18 for lifter adjustment and an output rotary member 18' for height adjustment are rotatably mounted on the input shaft 16. The output rotary member 18 is provided with an input pin 18a extending toward the input plate 17 in parallel with the shaft 16 (FIG. 5), and an output gear 18b meshing with the gear arm 9. The output rotary member 18' is also provided with an input pin 18a' and an output gear 18b' which meshes with the sector gear 3.

A coiled lock spring 19 is positioned between the input plate 17 and the output rotary member 18 and tightly engaged with the inner periphery of the cylindrical wall 15a of the brake drum 15. Opposite ends 19a and 19b of the lock spring 19 are bent radially inwardly. A pair of substantially sector-shaped actuating pieces 20 and 21 are rotatably mounted on the input shaft 16 between the input plate 17 and the output rotary member 18, while a spacer 22 is interposed between the pieces 20 and 21.

Figure 4A:
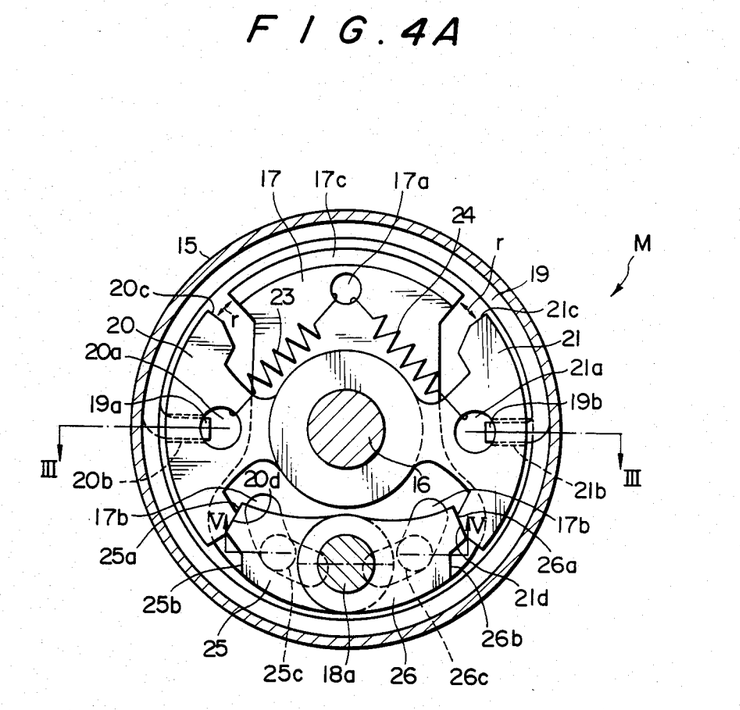
FIGS. 4A and 4B are sections along line IV—IV of FIG. 3 showing the mechanical brake in different positions.
Figure 4B:
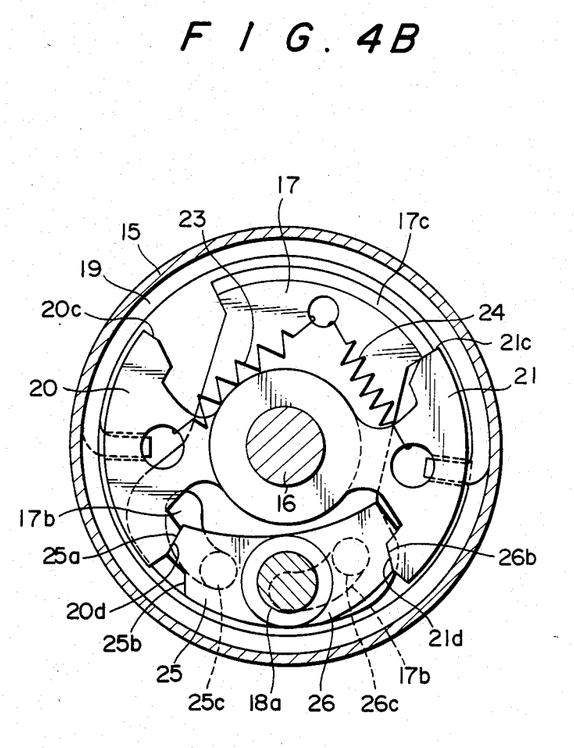

An arrangement inside the brake drum 15 is shown in detail in FIGS. 4A and 4B. As shown, the actuating pieces 20 and 21 are formed with axially extending apertures 20a and 21a, respectively. A return spring 23 is anchored at one end to the aperture 20a and at the other end to the aperture 17a of the input plate 17. Likewise, a return spring 24 is anchored at one end to the aperture 21a and at the other end to the aperture 17a. Through bores 20b and 21b respectively extend radially inwardly from the outer peripheries of the pieces 20 and 21 to the apertures 20a and 21a to receive the opposite bent ends 19a and 19b of the lock spring 19. The pieces 20 and 21 include respectively radially extending input contact surfaces 20c and 21c at one side and output contact surfaces 20d and 21d at the other side which are inclined relative to the radial direction. The pieces 20 and 21 normally remain in the position shown in FIG. 4A under the action of the return springs 23 and 24. Specifically, in FIG. 4A, the input contact surfaces 20c and 21c each face the nearby side edge of the input pawl 17c of the input plate 17 at a predetermined spacing r.

Figure 5:
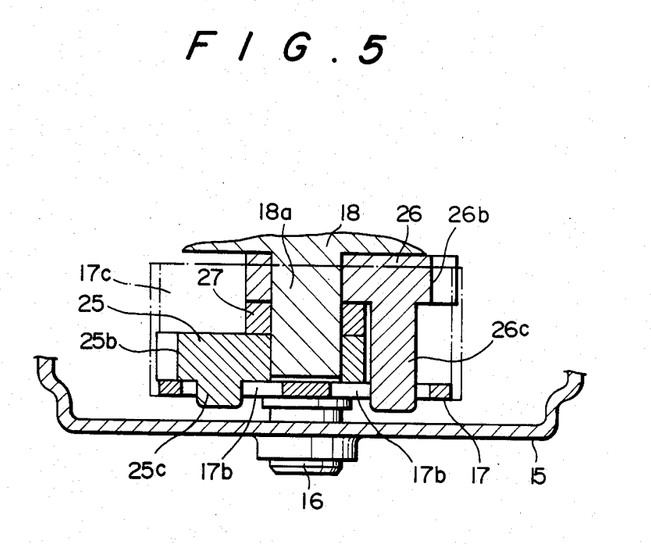
FIG. 5 is a fragmentary section along line V—V of FIG. 4A.

As shown in FIGS. 4A, 4B and 5, a pair of guide pieces 25 and 26 are rotatably mounted on the input pin 18a of the lifter adjustment output rotary member 18 with a spacer 27 positioned therebetween. Each of the guide pieces 25 and 26 includes a contact surface which is engageable with the output contact surface 20d or 21d of the actuating piece 20 or 21. The contact surfaces of the guide pieces 25 and 26 comprise radially inward contact surfaces 25a and 26a and radially outward contact surfaces 25b and 26b. The inner contact surfaces 25a and 26a are normally held in contact with the output contact surfaces 20d and 21d of the pieces 20 and 21, respectively. Guide pins 25c and 26c extend respectively from the guide pieces 25 and 26 toward the input plate 17 to be received in the bent slots 17b. In a normal condition, the guide pins 25c and 26c respectively are positioned at the intermediate bent portions of the slots 17b, as shown in FIG. 4A.

Also arranged inside the outer brake drum 15' are a lock spring 19', actuating pieces 20' and 21', a spacer 22', return springs 23' and 24', guide pieces 25' and 26', and a spacer 27'.

The above mentioned members 15-27 constitute in combination a mechanical brake for lifter adjustment as generally labeled M. Likewise, the members 15'-27' constitute a mechanical brake M' for height adjustment.

As shown in FIGS. 1A, 1B and 6-8, a spacer 28 and an input member 29 for height adjustment each having an opening which is identical in section with the notched portion 16a' of the input shaft 16' are mounted on the portion 16a' through the openings. In this construction, the input member 29 is rotatable intregrally with the input shaft 16'. The input member 29 is provided with a cam slot $C_1$ which comprises a circumferentially extending arcuate slot 29a and a slot 29b communicating to and extending radially outwardly from the arcuate slot 29a.

A flat input member 30 and a spacer 31 for lifter adjustment each having an opening which is identical in section with the notched portion 16a of the input shaft 16 are mounted on the portion 16a through the openings, the portion 16a protruding from the input shaft 16'. In this construction, the input member 30 and input shaft 16 are rotatable integrally with each other. A nut 33 is screwed over the threaded reduced diameter end of the input shaft 16 through a washer 32, thereby fixing the input member 30 and spacer 31 in place.

A tubular shell 34 is provided in an upper portion of the lifter adjustment input member 30 to extend parallel to the general plane of the input member 30, that is, perpendicular to and offset from the input shaft 16. A tubular control lever 35 is inserted into the tubular shell 34 and provided with a grip 35g at its outermost end. The external diameter of the control lever 35 is decreased over a portion 35a adjacent to the axially outermost end and increased over a portion 35b adjacent to the axially innermost end, the larger diameter portion 35b being received in the shell 34 in an axially slidable manner. The smaller diameter portion 35a is supported by a portion 30a which is provided in the lifter adjustment input member 30. In this particular embodiment, the control lever 35 serves as a control member T for rotating the input member 30. A return spring 36 is anchored at one end to the control lever 35 and at the other end to an end wall of the shell 34, thereby constantly biasing the control lever 35 toward the most retracted position which is indicated by a solid line in FIG. 6.

A clutch lever 38 and an actuating lever 39 are pivotably supported by a common shaft 37 at their intermediate portions and mounted to the lifter adjustment input member 30. The clutch lever 38 has at one end thereof a pawl 38a which extends throughout an opening 30b formed through the input member 30 to be engaged in the cam slot $C_1$ of the lifter adjustment input member 29. The clutch lever 38 has at the other end a substantially vertically bent riser portion 38b. Meanwhile, the actuating lever 39 has at one end thereof an abutment 39a which is held in contact with the outer periphery of the control lever 35, and at the other end a substantially vertically bent riser portion 39b. A spring 40 is retained at one end by the clutch lever 38 and at the other end by the actuating lever 39, so that normally the levers 38 and 39 are rotatable integrally with each other. A spring 41 is loaded between the clutch lever 38 and the input member 30 in order to maintain the abutment 39a of the lever 39 in contact with the control lever 35.

As the clutch lever 38 is rotated, its pawl 38a is moved between the arcuate slot 29a and the radial slot 29b of the cam slot $C_1$. In this particular embodiment, therefore, the pawl 38a serves as a clutch pawl $C_2$ which cooperates with the cam slot $C_1$ to constitute a clutch mechanism C. The height adjustment input member 29 and the lifter adjustment input member 30 are accommodated in a cover 42 which is rigidly connected to the input member 30.

Figure 6:
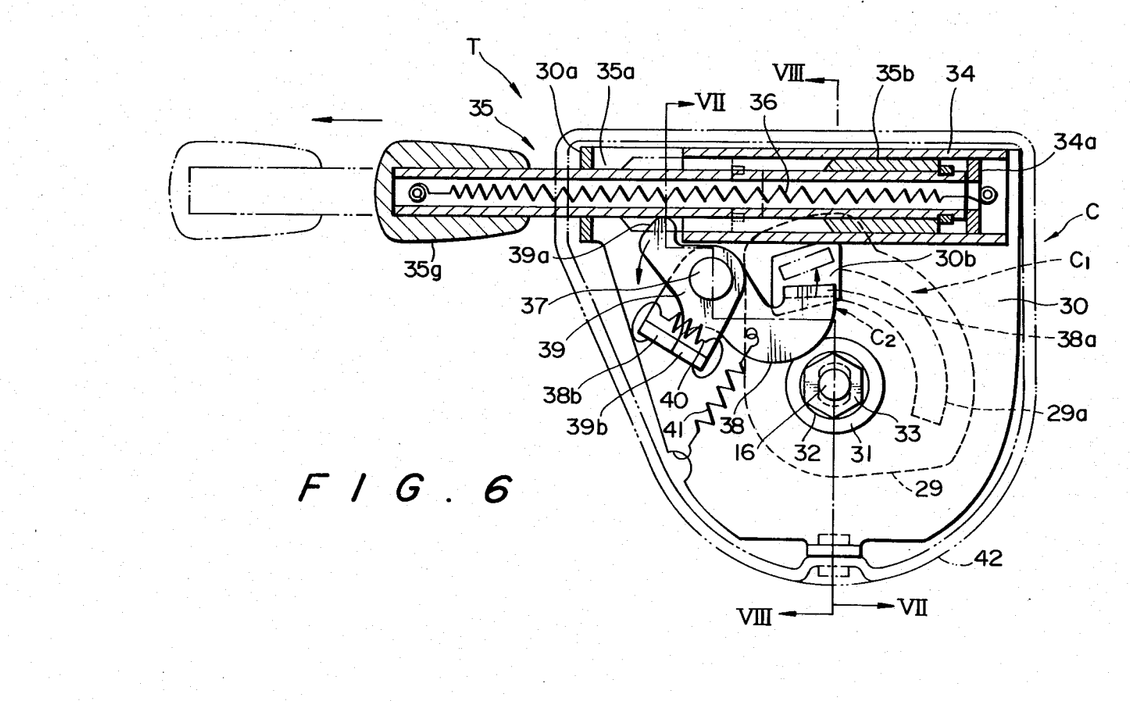
FIG. 6 is a side elevation of an operating section included in the device.
Figure 7:
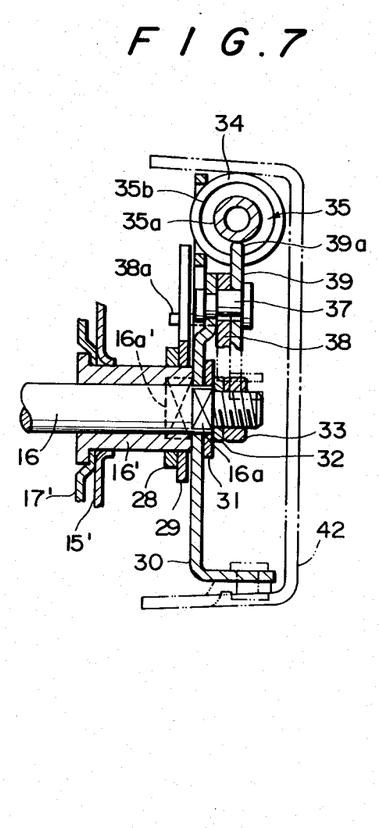
FIG. 7 is a section along line VII—VII of FIG. 6.
Figure 8:
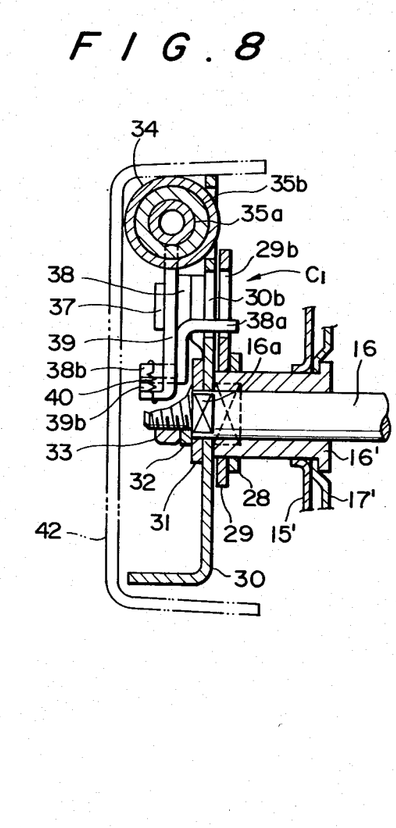
FIG. 8 is a section along line VIII—VIII of FIG. 6.

In operation, the control lever 35 is normally maintained in the retracted position by the return spring 36 as indicated by a solid line in FIG. 6. In this condition, the abutment 39a of the actuating lever 39 is pressed against the outer periphery of the smaller diameter portion 35a of the control lever 35. The clutch lever 38 is held in a position indicated by a solid line in FIG. 6 by the spring 41, the pawl 38a being positioed in the arcuate slot 29a of the height adjustment input member 30. As the control lever 35 is pulled up from the illustrated position, the input membe 30 is caused to rotate clockwise as viewed in FIG. 6 about the input shaft 16. This does not cause the input member 29 to rotate because the pawl 38a of the clutch lever 38 moves along the arcuate slot 29a of the input member 29. Stated another way, the clutch mechanism between the input members 30 and 29 remains uncoupled to enable relative rotation of the input members 30 and 29.

Upon the clockwise rotation of the input member 30, the input shaft 16 is rotated to in turn rotate its associated input plate 17 clockwise as viewed in FIGS. 4A and 4B. As the input plate 17 rotates clockwise, its bent guide slots 17b are displaced. Since the guide pin 26c which is engaged in one of the guide slots 17b is guided in the radial direction, the guide piece 26 which is provided with the guide pin 26c rotates counterclockwise about the input pin 18a on the output rotary member 18 as shown in FIG. 4B. Therefore, when the input plate 17 has been rotated to a position where the end face of the input pawl 17c abuts against the input contact surface 21c, the guide piece 26 is brought into engagement with the output contact surface 21d of the actuating piece 21 at its outer contact surface 26b.

As the input plate 17 is further rotated clockwise from the position shown in FIG. 4B, the actuating piece 21 rotates clockwise to reduce the diameter of the lock spring 19 which has been tightly engaged with the inner periphery of the brake drum 15. Due to the rotation of the actuating piece 21, the input pin 18a of the output rotary member 18 is urged through the guide piece 26 with the result that a rotational moment acts on the output rotary member 18. This causes the output rotary member 18 to rotate together with the input shaft 16. Then, the gear arm 9 which is meshed with the output gear 18b is rotated as indicated by an arrow in FIG. 1A, whereby the lifter adjustment shaft 8 and front support arm 10 are rotated in the same direction as the gear arm 9.

Figure 9A:
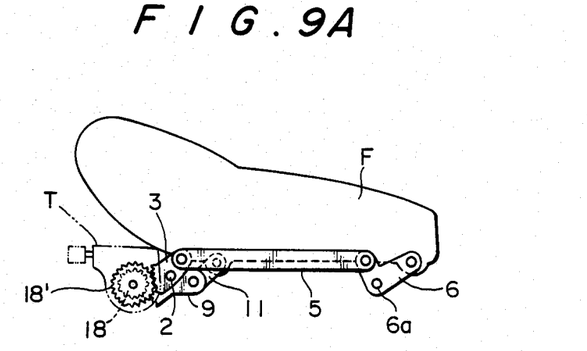
FIG. 9A shows the device in a position before adjustment.
Figure 9B:
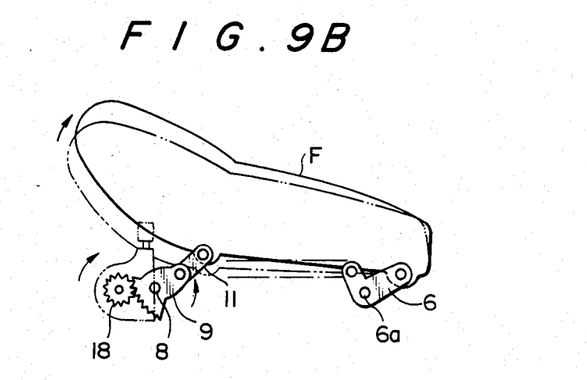
FIG. 9B shows the device in a position representative of lifter adjustment.

When the gear arm 9 and support arm 10 are rotated counterclockwise from the position shown in FIG. 9A, the points of connection of the arms 9 and 10 with their associated links 11 and 11' are raised. In this instance, since the rear part of the seat F is journalled at a fixed position, the linkages made up of the arms 9 and 10 and links 11 and 11' are stretched so that the front part of the seat F is rotated upwardly about the journalled point of the rear part, as shown in FIG. 9B.

As the control lever 35 is released after the adjustment of the height of the seat front part, the input plate 17 of the mechanical brake M is restored to the neutral position as shown in FIG. 4A by the action of the return springs 23 and 24. In this condition, the output contact surfaces 20d and 21d of the actuating members 20 and 21 are held in engagement with the inner contact surfaces 25a and 26a of the guide pieces 25 and 26. Hence, despite that a torque due to the load of the seat F side acts on the output rotary member 18 tending to cause the input pin 18a to rotate about the input shaft 16, it is immediately transmitted to the actuating pieces 20 and 21 to act thereon in a direction for increasing the diameter of the lock spring 19. The result is a substantial magnitude of friction force developing between the lock spring 19 and the inner periphery of the brake drum 15, which serves to surely prevent the input pin 18a from rotating about the shaft 16.

In the manner described, the mechanical brake M transmits an effort applied from the control lever 35 side to the output side, but surely applies a brake when an external force is exerted from the output side. The seat F, therefore, is positively retained in the selected position and may be moved up and down by further upward or downward movement of the control lever 35.

By the above-described manipulation of the control lever 35, the height and, therefore, the inclination of the front part of the seat F is adjusted. This is the lifter adjustment in accordance with the present invention.

Where it is desired to adjust the height of the whole seat F, the control lever 35 is pulled out to the left as indicated by an arrow in FIG. 6. As soon as the larger diameter portion 35b of the control lever 35 is aligned with the abutment 39a of the actuating lever 39, it urges the lever 39 counterclockwise in the drawing so that the clutch lever 38 retained by the spring 40 is rotated in the same direction to a position where the pawl 38a shifts itself into the radial slot 29b of the height adjustment input member 29. In this condition, as the control lever 35 is manipulated to rotate the lifter control input member 30 about the input shaft 16, the pawl 38a of the clutch lever 38 abuts against the edge of the radial slot 29b to cause the input member 29 to rotate together with the input member 30. Stated another way, the clutch mechanism C between the input members 30 and 29 is coupled to allow them to rotate integrally with each other.

Assuming that the control lever 35 has been pulled up after being pulled axially out of the shell 34, then the input members 30 and 29 are rotated clockwise as viewed in FIG. 6. The rotation of the input member 30 causes the gear arm 9 and front support arm 10 to rotate in the same manner as in the previously discussed lifter adjustment. Simultaneously, the rotation of the input member 29 causes the height adjustment input shaft 16' to rotate and, thereby, causes the mechanical brake M' to operate in the same manner as the mechanical brake M. As a result, the output rotary member 18' of the mechanical brake M' is rotated to in turn rotate the sector gear 3, which is meshed with the output gear 18b', as indicated by an arrow in FIG. 1A. At this instant, the height adjustment shaft 2 and arm 4 which are integral with the sector gear 3 are also rotated in the same direction pulling their associated rods 5 and 5', with the result that the rear support arms 6 and 6' connected respectively to the other end of the rods 5 and 5' are rotated about the associated hinge pins 6a and 6a'.

Figure 9C:
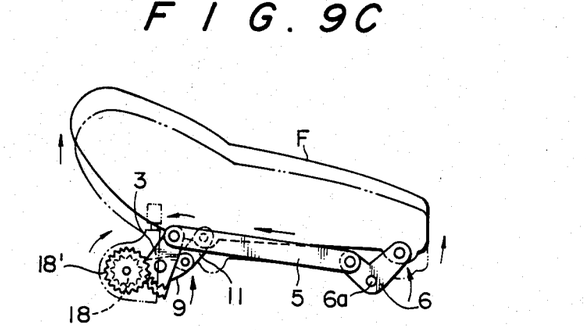
FIG. 9C shows the device in a position representative of height adjustment.

Lifting the control lever 35 as described above causes the gear arm 9, front support arm 10 and rear support arms 6 and 6' to rotate in the same direction. As the arms 9, 10, 6 and 6' are rotated counterclockwise from the position shown in FIG. 9A, they work as parallel links to bodily raise the seat F as shown in FIG. 9C. When the control lever 35 is released after the adjustment of the seat height, the seat is positively fixed at the selected level due to the operation of the mechanical brakes M and M'.

In the manenr described above, manipulating the control lever 35 upwardly or downwardly after pulling it out controls the seat F bodily to a desired height. That is, height adjustment complementary to a manipulated amount of the control lever 35 is attained.

While the clutch mechanism C has been shown and described as being coupled and uncoupled by axial sliding motions of the control lever 35, such is only illustrative and may alternatively be implemented by rotation of the control lever about its axis. Another possible implementation is a push button which is provided in the grip 35g of the control lever 35 and manipulated to couple and uncouple the clutch C, in which case the clutch C may comprise a solenoid-operated clutch.

Further, link mechanism made up of the support arms 9 and 10 and links 11 and 11' for serving as the seat front part support mechanism S may be replaced with pins extending horizontally from the support arms 9 and 10. Then, the pins will be slidably received in slots which are formed longitudinally in the seat F, thereby supporting the seat F. If desired, the alternative support mechanism implemented by pins may be applied to the seat rear part support mechanism S', and the seat rear part support mechanism S' in the illustrative embodiment to the seat front part support mechanism S.

In addition, the seat bracket bases 1 and 1' may be slidably mounted on slide rails to make the seat F slidable to and fro as desired.

In summary, it will be seen that the present invention provides a height adjusting device for a vehicle seat which allows both the lifter control and the height control to be accomplished as desired merely by manipulating a single control member. Furthermore, the device of the invention enables the seat to be steplessly adjusted to a desired level and locked at the selected level.

Various modifications will become possible for those skilled in the art after receiving the teachings of the present disclosure without departing from the scope thereof.

What is claimed is:

1. A device for adjusting the height of a seat which is mounted in a vehicle, comprising:

first and second seat front part support means operated by a lifter adjustment input member for selectively moving a front part of the seat upwardly and downwardly relative to seat bracket bases which are supported by a body of the vehicle;

first and second rear part support means operated by a height adjustment input member for selectively moving a rear part of the seat upwardly and downwardly relative to the seat bracket bases;

said lifter adjustment input member and said height adjustment input member being rotatably supported by said seat bracket bases on a same axis;

seat lock means for locking respectively the seat front part support means and the seat rear part support means in position;

clutch means interposed between the lifter adjustment input member and the height adjustment input member for selectively coupling to allow the lifter adjustment input member and the height adjustment input member to rotate integrally with each other and uncoupling to allow the lifter adjustment input member and the height adjustment input member to rotate relative to each other; and a control member associated with the lifter adjustment input member to be manipulated to rotate the lifter adjustment input member and couple and uncouple the clutch means, wherein the first seat front part support means and the first seat rear part support means comprises first support arms which respectively are rotatably supported by the seat bracket bases and link mechansims which respectively are connected at one end rotatably to free ends of said first support arms and at the other end rotatably to the seat, the second seat front part support means and the second seat rear part support means comprising second support arms which respectively are rotatably supported by the seat bracket bases and rotatably connected at free ends to the seat.

2. A device as claimed in claim 1, wherein one of said first support arms of the first seat front part support means and the first seat rear part support means comprises a gear arm having a toothed surface, one of the second support arms being operatively connected by a rod to a sector gear which is mounted coaxially with and rotatably relative to said gear arm, said gear arm and said sector gear meshing respectively with gears of a pair of output rotary members which respectively are rotated by the lifter adjustment input member and the height adjustment input member.

3. A device as claimed in claim 1, wherein the seat lock means comprise a lifter adjustment mechanical brake and a height adjustment mechanical brake each of which transmits rotation imparted from an input shaft associated with said mechanical brake to an output rotary member associated with said input shaft while applying a brake reponsive to rotation imparted from said output rotary member, said input shaft associated with the lifter adjustment mechanical brake being connected to the lifter adjustment input member, said output rotary member associated with the lifter adjustment mechanical brake being connected to the seat front part support means, said input shaft associated with the height adjustment mechanical brake being connected to the height adjustment input member, the output rotary member associated with the height adjustment mechanical brake being connected to the seat rear part support means.

4. A device as claimed in claim 1, wherein the control member comprises a control lever axially slidably supported by a tubular member which is fixed to the lifter adjustment input member at an angle to an axis of rotation of the lifter adjustment input member, said control lever including a first portion and a second portion which is larger in diameter than said first portion, an actuating lever being constantly held in contact with an outer priphery of the control lever, said actuating lever selectively making contact with the first and second portions responsive to axial sliding movement of the control lever to be thereby rotated to in turn to actuate the clutch means.

5. A device as claimed in claim 1, wherein the clutch means comprises a cam slot which is formed through the height adjustment input member and made up of a first slot extending along an arc a center of which aligns with an axis of rotation of the height adjustment input member and a second slot portion extending radially outwardly from said slot portion, and a clutch pawl provided on the lifter adjustment input member to be movable responsive to manipulation of the control member between a position where said clutch pawl is received in the first slot of the height adjustment input member and a position in which the the clutch pawl is received in the second slot.

6. A device for adjusting the height of a seat which is mounted in a vehicle, comprising:
first and second front part support means operated by a lifter adjustment input member for selectively moving a front part of said seat upwardly and downwardly relative to seat bracket bases which are supported by a body of said vehicle;
first and second rear part support means operated by a height adjustment input member for selectively moving a rear part of said seat upwardly and downwardly relative to said seat bracket bases;
said lifter adjustment input member and said height adjustment input member being rotatably supported by said seat bracket bases on a same axis;
seat lock means for locking respectively said seat front part support means and said seat rear part support means in position;
clutch means interposed between said lifter adjustment input member and said height adjustment input member for selectively coupling to allow said lifter adjustment input member and said height adjustment input member to rotate integrally with each other and uncoupling to allow said lifter adjustment input member and said height adjustment input member to rotate relative to each other; and
a control member associated with said lifter adjustment input member to be manipulated to rotate said lifter adjustment input member and couple and uncouple said clutch means;
wherein said seat lock means includes a lifter adjustment mechanical brake and a height adjustment mechanical brake each of which transmits rotation imparted from an input shaft associated with said mechanical brake to an output rotary member associated with said input shaft while applying a brake responsive to rotation imparted from said output rotary member, said input shaft associated with said lifter adjustment mechnical brake being connected to said lifter adjustment input member, said output rotary member associated with said lifter adjustment mechanical brake being connected to said seat front part support means, said input shaft associated with said height adjustment mechanical brake being connected to said height adjustment input member, said output rotary member associated with said height adjustment mechanical brake being connected to said seat rear part support means.

7. A device for adjusting the height of a seat which is mounted in a vehicle, comprising:
first and second front part support means operated by a lifter adjustment input member for selectively moving a front part of said seat upwardly and downwardly relative to seat bracket bases which are supported by a body of said vehicle;
first and second rear part support means operated by a height adjustment input member for selectively moving a rear part of said seat upwardly and downwardly relative to said seat bracket bases;
said lifter adjustment input member and said height adjustment input member being rotatably supported by said seat bracket bases on a same axis;
seat lock means for locking respectively said seat front part support means and said seat rear part support means in position;
clutch means interposed between said lifter adjustment input member and said height adjustment input member for selectively coupling to allow said lifter adjustment input member and said height adjustment input member to rotate integrally with each other and uncoupling to allow said lifter adjustment input member and said height adjustment input member to rotate relative to each other; and a control member associated with said lifter adjustment input member to be manipulated to rotate said lifter adjustment input member and couple and uncouple said clutch means;

wherein said control member includes a control lever axially slidably supported by a tubular member which is fixed to said lifter adjustment input member at an angle to an axis of rotation of said lifter adjustment input member, said control lever including a first portion and a second portion which is larger in diameter than said first portion, an actuating lever being constantly held in contact with an outer periphery of said control lever, said actuating lever selectively making contact with said first and second portions responsive to axial sliding movement of said control lever to be thereby rotated to in turn to actuate said clutch means.

8. A device for adjusting the height of a seat which is mounted in a vehicle, comprising:

first and second front part support means operated by a lifted adjustment input member for selectively moving a front part of said seat upwardly and downwardly relative to seat bracket bases which are supported by a body of said vehicle;

first and second rear part support means operated by a height adjustment input member for selectively moving a rear part of said seat upwardly and downwardly relative to the seat bracket bases;

said lifter adjustment input member and said height adjustment input member being rotatably supported by said seat bracket bases on a same axis;

seat lock means for locking respectively said seat front part support means and said seat rear part support means in position;

clutch means interposed between said lifter adjustment input member and said height adjustment input member for selectively coupling to allow said lifter adjustment input member and said height adjustment input member to rotate integrally with each other and uncoupling to allow said lifter adjustment input member and said height adjustment input member to rotate relative to each other; and a control member associated with said lifter adjustment input member to be manipulated to rotate said lifter adjustment input member and couple and uncouple said clutch means;

wherein said clutch means includes a cam slot which is formed through said height adjustment input member and made up of a first slot extending along an arc a center of which aligns with an axis of rotation of said height adjustment input member and a second slot portion extending radially outwardly from said slot portion, and a clutch pawl provided on said lifter adjustment input member to be movable responsive to manipulation of said control member between a position where said clutch pawl is received in said first slot of said height adjustment input member and a position in which said clutch pawl is received in said second slot.

* * * * *

UNITED STATES PATENT AND TRADEMARK OFFICE
CERTIFICATE OF CORRECTION

PATENT NO. : 4,648,575
DATED : March 10, 1987
INVENTOR(S) : TATEO KAWADE

It is certified that error appears in the above-identified patent and that said Letters Patent is hereby corrected as shown below:

On the cover page, Item [73], before "Japan" insert

--- Tokyo, ---

Signed and Sealed this

Eighth Day of September, 1987

*Attest:*

DONALD J. QUIGG

*Attesting Officer*  *Commissioner of Patents and Trademarks*